W. C. HAMMER.
STUMP PULLER.
APPLICATION FILED DEC. 14, 1915.
1,195,004.
Patented Aug. 15, 1916.
2 SHEETS—SHEET 1.
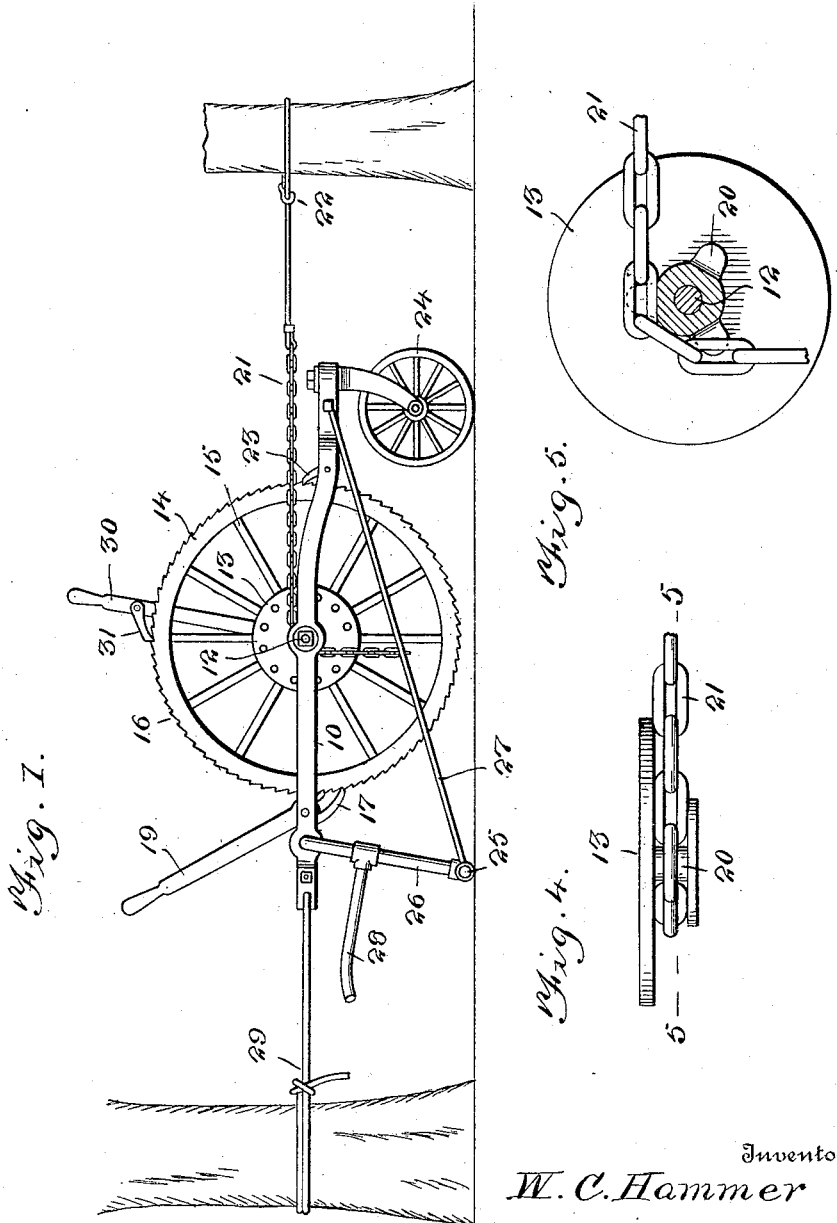
Witnesses
E. R. Ruppert.
Edw H Yeager
Inventor
W. C. Hammer
By Victor J. Evans
Attorney W. C. HAMMER.
STUMP PULLER.
APPLICATION FILED DEC. 14, 1915.
1,195,004.
Patented Aug. 15, 1916.
2 SHEETS—SHEET 2.
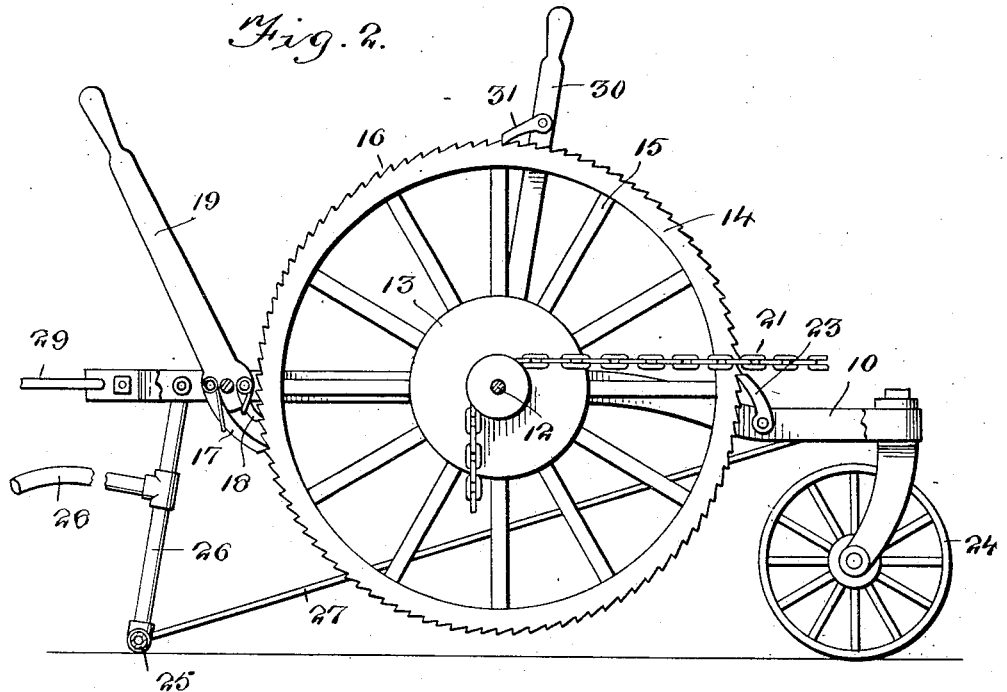
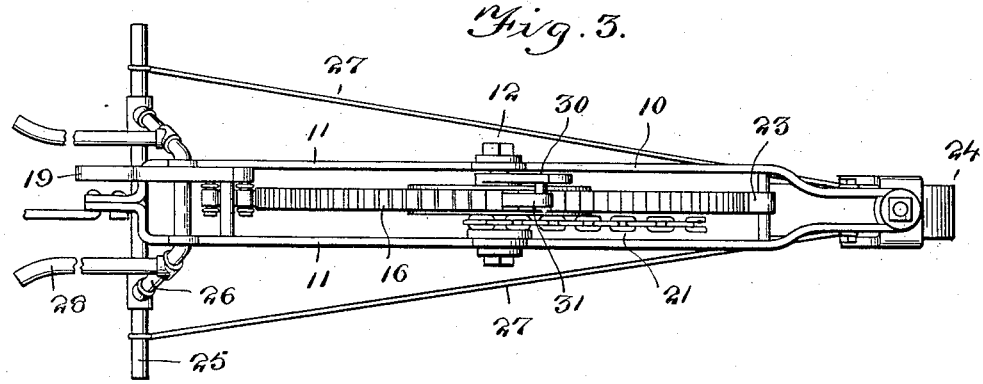
Inventor
W. C. Hammer
Witnesses
By Victor J. Evans
Attorney

UNITED STATES PATENT OFFICE.

WILFORD C. HAMMER, OF SCOTTS MILLS, OREGON.

STUMP-PULLER.

1,195,004.  Specification of Letters Patent.  Patented Aug. 15, 1916.

Application filed December 14, 1915. Serial No. 66,787.

*To all whom it may concern:*

Be it known that I, WILFORD C. HAMMER, a citizen of the United States, residing at Scotts Mills, in the county of Marion and State of Oregon, have invented new and useful Improvements in Stump-Pullers, of which the following is a specification.

This invention relates to improvements in machines for pulling stumps or roots of trees, and for similar purposes.

It is the primary object of my invention to provide a machine of this character, which is very light to permit of its being readily and easily transported from place to place and at the same time possessing the requisite strength and durability.

Other objects and advantages will appear as the following description is read in connection with the accompanying drawings, the invention residing in the construction, combination and arrangement of parts hereinafter more fully set forth and claimed.

In the drawings forming part of this specification like numerals of reference indicate similar parts in the several views and wherein:—

Figure 1 is a side elevation of the machine showing the manner of using the same. Fig. 2 is an enlarged side elevation with one of the frame members removed. Fig. 3 is a top plan view. Fig. 4 is a detail section of the sprocket and chain. Fig. 5 is a sectional view on line 5—5 of Fig. 4.

A machine constructed in accordance with the preferred embodiment of the invention as herein disclosed, consists of a frame generally indicated at 10 including spaced parallel beams 11 between which is journaled a shaft 12, and fixed upon the shaft for rotation therewith is a comparatively large wheel comprising a hub 13, rim 14 and the spokes 15. The periphery of the wheel is provided with a ratchet surface 16 with which the pawls 17 and 18 respectively coöperate, to rotate the wheel in one direction in the manner to be presently described. The beams 11 extend a considerable distance both forwardly and rearwardly beyond the wheel, and pivotally mounted upon the frame immediately at the rear of the wheel is an operating lever 19 with which the pawls 17 and 18 are pivotally associated and normally engage the ratchet surface 16, whereby as the lever is moved in opposite directions, the said pawls alternately operate to rotate the wheel as will be readily understood.

Fixed upon the hub 13 for rotation therewith is a sprocket wheel 20 adapted to be engaged by the chain 21 for the purpose of moving the chain thereover as the wheel is rotated, thus exerting a pull upon the chain in one direction with a view of extracting the stump or root of the tree from the ground, it being of course understood that one end of the chain is to be secured to the stump in any suitable manner as at 22 as clearly illustrated in Fig. 1. Pivotally mounted between the beam members 11 in advance of the ratchet wheel is a pawl 23 which normally engages the ratchet surface of said wheel to assist the pawls 17 and 18 respectively in preventing retrograde movement of the wheel, thereby relieving the said pawls 17 and 18 of undue strain in this connection. Depending from the forward extremity of the beam members 11 and connected therewith in any suitable manner is a relatively small wheel 24 adapted to coöperate with the supporting means at the opposite ends of the bearing members, to support the operating wheel of the device in spaced relation to the ground. The supporting means at the rear end of the beams 11 preferably consist of a horizontal ground engaging member 25 from which rises the standards 26, which latter are connected with the beams 11. Arranged at the opposite sides of the machine are the brace rods 27, the latter having their forward ends secured to the beams 11 adjacent the wheel 24, while the opposite ends of the brace rods are secured to the horizontal member 25 as shown. Projecting rearwardly from the standards 26 are suitable handles 28, by means of which the machine is adapted to be tilted, and moved upon the wheel 24 from place to place in the manner similar to the ordinary and well known form of wheel barrow.

Briefly stated, the use of the machine is as follows:—The machine is first moved to the desired position in the field, and then anchored to a tree or other suitable support by means of the anchoring element 29 which is connected to the rear ends of the beams 11. The chain is then secured to the stump or root to be extracted, and also associated with the sprocket 20. A lever 30 having associated therewith a pawl 31 normally engaging the ratchet surface of the operating wheel, may be then operated to quickly rotate the wheel with a view of taking up the slack in the chain. The lever 19 is then operated to gradually rotate the wheel, whereupon the chain is drawn over the sprocket 20, thereby exerting a pull upon the chain in the proper direction to effect an extraction of the stump or root from the ground. It will be manifest from the construction disclosed that the machine is very light, which permits the same to be quickly moved from place to place and that it may be operated for the purpose intended by one person.

It is believed that from the foregoing description the nature and advantages of the invention will be readily apparent, although I desire to have it understood that I do not limit myself to the precise construction and arrangement herein illustrated and described, and that various changes may be resorted to when desired as fall within the scope of the appended claim.

What is claimed is:—

A machine of the class described comprising a wheeled frame embodying spaced parallel beams connected at their opposite ends, a relatively large ratchet wheel journaled between said beams, a relatively small sprocket carried by said wheel, a chain adapted to be moved over the sprocket and associated therewith, a lever pivoted on the frame rearwardly of said wheel, a pair of spring pressed pawls associated with the lever and alternately operating to rotate said wheel in one direction when the lever is oscillated, a pawl pivoted on the frame in advance of said wheel and operating to prevent retrograde movement thereof, a second lever pivoted on the frame at one side of the wheel and projecting thereabove, and a pawl associated with the lever to rotate said wheel when said lever is operated prior to the operation of the first mentioned lever as described.

In testimony whereof I affix my signature in presence of two witnesses.

WILFORD C. HAMMER.

Witnesses:
M. W. KELSEY,
S. D. ADKINS.

Copies of this patent may be obtained for five cents each, by addressing the "Commissioner of Patents, Washington, D. C."